United States Patent Office.

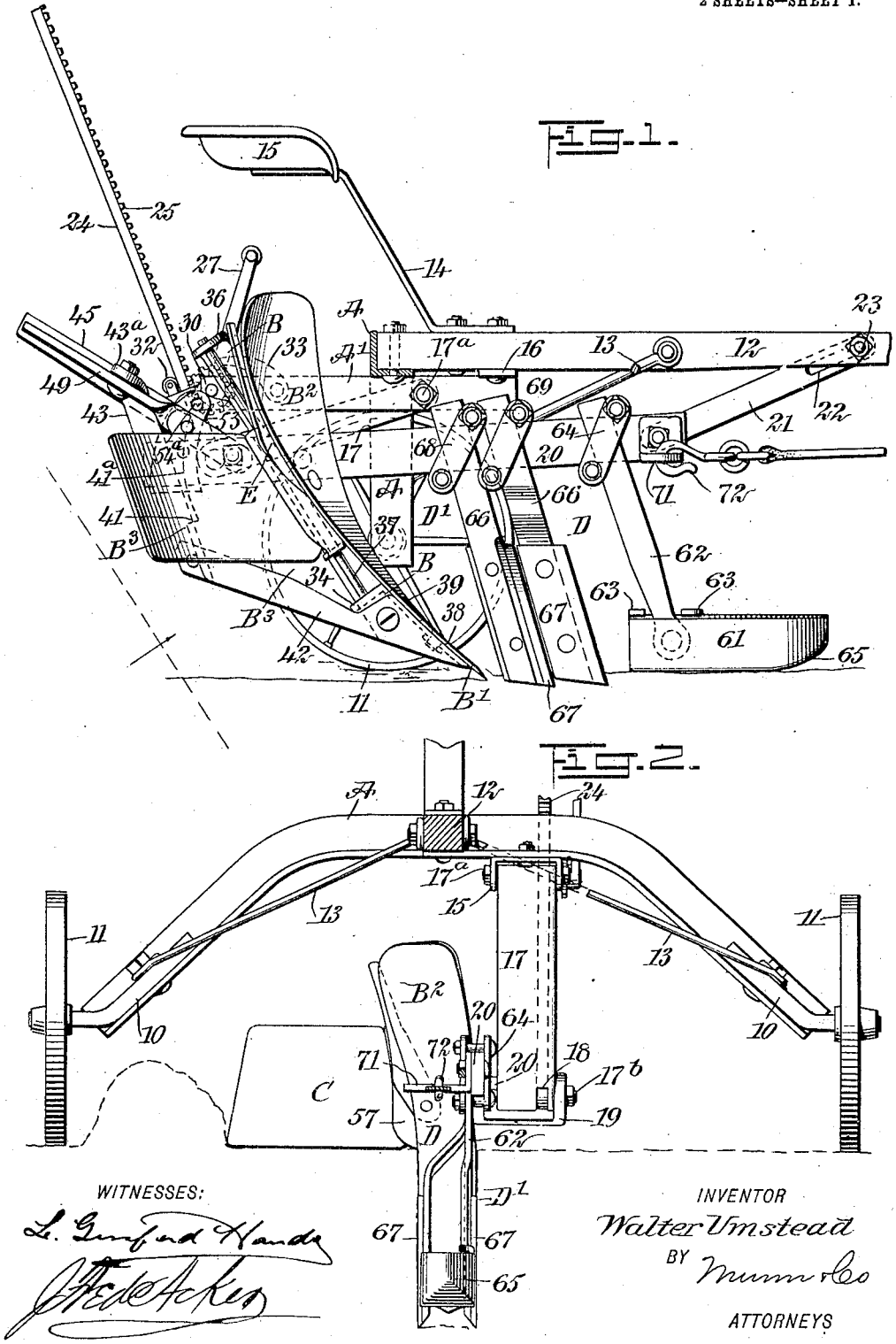

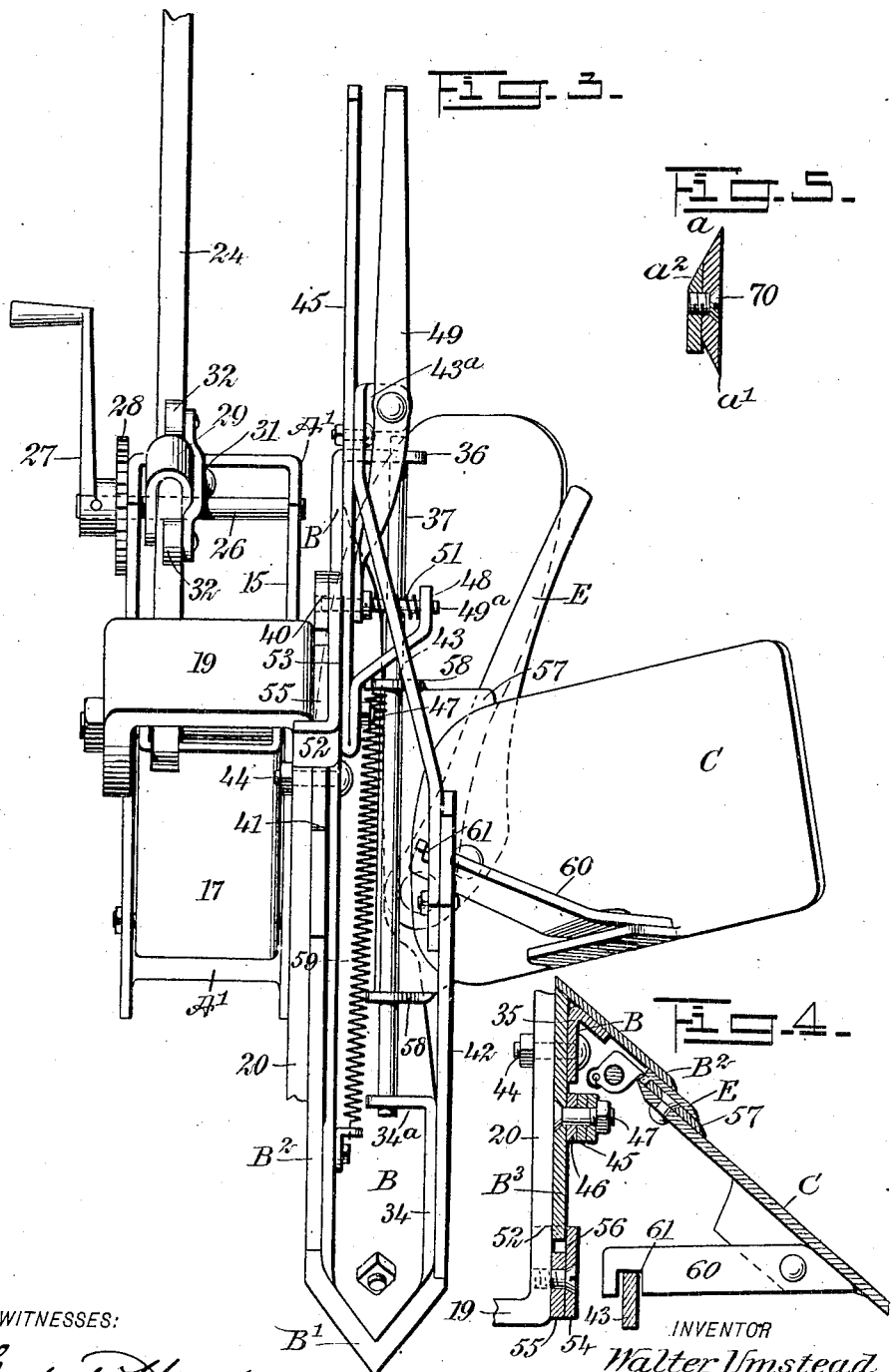

WALTER UMSTEAD, OF JERSEYTOWN, PENNSYLVANIA.

DITCHING-MACHINE.

No. 852,207.  Specification of Letters Patent.  Patented April 30, 1907.

Application filed February 21, 1906. Serial No. 302,305.

*To all whom it may concern:*

Be it known that I, WALTER UMSTEAD, a citizen of the United States, and a resident of Jerseytown, in the county of Columbia and State of Pennsylvania, have invented a new and Improved Ditching-Machine, of which the following is a full, clear, and exact description.

The purpose of the invention is to improve upon the construction of a ditching machine for which Letters Patent were granted to me in the United States, May 2, 1905, Serial No. 788,965, whereby the point of the plow is given a long downward curve at its working end, rendering it much more effective in service, and its entrance into the ground much more gradual, and further making the point detachable and providing quite a long flat surface for the working face of the plow at the point, and imparting a twist to the plow where the point joins the mold-board section in order to start the ground to the mold-board section to be moved along by the cleaning wing at the surface of the ditch.

Another improvement consists in so mounting the plow as to give it a slanting pitch for the top of the ditch, and so that the inclination can be changed as the ditch deepens to obtain a more vertical pitch and to keep the twisted portion of the plow as near as possible to the top of the ditch, so that the earth will be raised without crowding the bank and breaking the edges of the ditch.

A further improvement is to so mount the plow that it can be pitched forward and above the level of the bottom of the cutters to enable all of the force to be brought to bear upon the cutters, and to permit the loosened earth to pass under the plow in the event the ground is very hard at the bottom of the ditch, otherwise the ground is continuously thrown out from the ditch.

Another improvement is to so mount and construct the cleaning wing that it will accommodate itself to the difference in depth of the ditch, and so that it will automatically tilt up and down to accommodate itself to the differences in the pitch of the plow, enabling the cleaning wing to scrape level on the surface of the ground at all times.

Another improvement lies in the provision of a boat-shaped guide, adjustably located in advance of the cutters, and in rendering the cutters reversible and detachable, and providing them with opposing cutting edges, so that a cutter can be used twice as long as ordinary without sharpening.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a side elevation of the machine with the frame beam in section; Fig. 2 is a front elevation of the machine with the frame beam in section; Fig. 3 is an enlarged view of the body of the machine viewed partly from the bottom and partly from a side of the machine, the said body being tilted upward and rearward from the bottom, the view being taken on the dotted line in Fig. 1 looking in the direction of the arrow crossing said line; Fig. 4 is an enlarged horizontal section through the plow and the clearing wing; and Fig. 5 is an enlarged horizontal section through the cutter shank and cutter.

A represents the frame bar, which is arched and made of angle iron, and to the end portions of this bar the spindles 10 are secured which carry the supporting wheels 11. The frame beam 12 is attached to a frame bar A at its center and extends forward a desired distance, and at its forward end is adapted to carry a neck yoke, not shown in the drawings. This frame beam 12 is braced by bars 13 attached to its sides and to the arched frame bar A, as is best shown in Fig. 2. The support 14 for the driver's seat 15 is secured to the rear portion of the said frame beam 12 as is illustrated in Fig. 1.

A horizontal channel bar A' is secured to the under face of the arched frame bar A to the left hand side of its center, and the said channel bar A' extends farther to the rear than to the front and is supported at the front by a bracket bar 16 secured to the channel bar and to the under face of the frame beam 12, as is also shown in Fig. 1. A link 17, also preferably made in the form of a channel iron, is pivoted at its upper end to the horizontal channel bar A', preferably at a point just in advance of the attachment of said channel bar A' to the frame bar A, the pivotal connection being made through the medium of a pivot pin 17ª, as is best shown in Figs. 1 and 2, and the lower end of the said link 17 is pivotally connected through the medium of a bolt 17ᵇ or its equivalent, to the rear U-shaped head section 19 of a forwardly-extending plow beam 20. At the lower end of the link 17 a recess 18 is made for a purpose to be hereinafter described. The forward end of the plow beam 20 is suspended by means of a link 21 pivotally attached to the forward portion of the said plow beam, as is shown in Fig. 1, and the said link 21 is provided at its upper end with a longitudinal slot 22, through which slot a bolt 23 is loosely passed, the said bolt being secured to the frame beam 12, so that the forward end of the plow beam 20 can be raised or lowered, and at the same time through the medium of the links 17 and 21 the plow beam may be swung forwardly or rearwardly as desired.

The lower end of a rack bar 24 is pivoted on the pivot bolt 17ᵇ for the link 17, and the lower portion of the said rack bar 24 is opposite the recess 18 above referred to. The teeth 25 of the said rack bar are upon its forward face as is shown in Fig. 1.

A shaft 26 is mounted to turn in the rear portion of the horizontal channel bar A' as is shown in Fig. 3; and this shaft 26 is provided with a crank arm 27 at its outer end, whereby to turn the shaft; and a ratchet wheel 28 is made fast to the said shaft 26 or is attached to the sleeve portion of the crank arm 27, as is also shown in Fig. 3.

A U-shaped bracket 29 is loosely mounted on the shaft 26, and the said U-shaped bracket extends rearward. Between the members of this bracket a pinion 30 is secured to the shaft 26, the said pinion being adapted for engagement with the teeth of the rack bar 24, said rack bar being passed up through the U-shaped bracket 29 as is best illustrated in Fig. 3.

In order to reduce the friction when the rack bar is raised and lowered by the turning of the shaft 26, an arm 31 is secured to one side of the bracket 29, extending above and below the bracket, and said arm is provided with friction rollers 32 at its ends, and these friction rollers engage with the rear plain face of the rack bar 24. By moving the rack bar 24 upward and downward, the plow beam is raised or lowered, or adjusted as to elevation, and said plow beam is held in its adjusted position by means of a pawl 33 which is pivoted on the horizontal channel bar A', and is adapted for engagement with the teeth of the ratchet wheel 28.

In the construction of the plow, a plow frame B is provided, consisting of a metal bar of suitable width, being of inverted U-shape at its lower portion 34, its remaining portion 35 being substantially L-shaped in cross section, as is shown in Figs. 3 and 4. The lower extremity of the plow frame B is pivoted and its lower portion is given a long gradual downward and forward curvature while its upper portion is substantially straight. Where the U-shaped formation of the plow frame B terminates an inwardly-extending lug 34ª is formed at the right-hand side, and at the top of the said bar an outwardly-extending registering lug 36 is produced, which lugs form supports for the end portions of a guide bar 37. The point B' of the plow is removably secured to the frame by means of screws or their equivalents, and the upper face 38 of the said point is flat, although said point is given a gradual downward and forward inclination, as is shown in Fig. 1. The mold-board B² is given the usual transverse curved to the right, and is secured to the plow frame B by bolts or rivets; but where the mold-board B² joins the point B' the mold-board is given a gradual twist from left to right, as shown at 39 in Fig. 1, whereby to impart a quick start to the loosened earth from the point to the mold-board, to be delivered by said mold-board to the surface of the ground at the right of the ditch.

The land side B³ is made quite high, extending upward almost as high as the central portion of the mold-board, and the land side is bolted or otherwise secured to the plow frame B. At the upper rear end of the land side a rearwardly-extending apertured lug 40 is formed, and the rear portion of the land side, which is more or less segmental, is provided with a recess 41ª, extending from the lug 40 downward to a point near its lower end to provide a shoulder 41, as is shown by dotted lines in Fig. 1, for a purpose to be hereinafter described.

A brace bar 42 is attached to the forward right-hand side of the plow frame B, which bar 42 extends rearward parallel with the bottom edge of the land side B³, and is secured at its rear to the upwardly and rearwardly-extending guide bar 43, terminating a slight distance to the rear of and above the land side B³. However, the bars 42 and 43 can be made in one piece if desired.

The land side B³ is pivoted to the plow beam 20 by means of a suitable bolt 44, as shown in Figs. 3 and 4, and a handle 45 is offset from the inner face of the mold board B² by a washer 46 and is secured to the mold board by a bolt 47. This handle extends upward and rearward beyond the mold board, and the material thereof at its inner end is returned to form a bracket 48. The upper end of the guide bar 43 is secured to the handle 45 as shown in Fig. 3, and the upper portion of the guide-bar is flattened to form an ear 43ª, upon which the hand lever 49 is pivoted; and the said lever 49 is attached to a pin 49ª, held to slide in the bracket 48 and in an opening in the handle 45. The outer end of the said pin is adapted to enter the aperture in the lug 40 of the landside, as is indicated in Fig. 3, and said pin is normally held in such position by a spring 51.

The lower end 52 of an upwardly-curved plate 53 is secured to the under face of the plow beam 20 at its right-hand side, and the upright curved plate 53 is provided with series of apertures $54^a$, through any one of which the pin 49 is adapted to pass before entering the aperture in the lug 40 of the land side, since the plate 53, which is virtually a keeper plate extends up at the outer or right-hand side of the land side, and a portion of the space between the keeper 53 and the plow beam 20 is closed by a block 54, shown in Figs. 3 and 4; but a sufficient space is left between the keeper and the plow beam to form a guide 56 for the recessed portion $41^a$ of the land side $B^3$. It will thus be observed that the plow and its beam by means of the rack and pinion described can be raised or lowered as needed; and that when the pin is carried out of locking engagement with the keeper 53 through the medium of the lever 49, by moving the handle up or down the plow point may be given any angle or inclination desired or deemed most advantageous during the work of ditching. It is also obvious that the plow point can be securely locked in its adjusted position, and should the plow point become broken or otherwise damaged it can be readily removed and as readily replaced by a new one. The shoulder 41 on the land side upon striking the spacing block 54 limits the upward adjustment of the plow.

A cleaning wing C is provided, adapted to travel over the surface of the ground at the right-hand side of the ditch to scrape the loose dirt from the edge of the ditch and carry it some distance rearward therefrom. This wing C is in the form of a rectangular plate and has more or less of an upward and rearward inclination and an inclination from the mold board rearward and to the right. The wing C is pivoted to a carrying plate 57, provided with upper and lower eyes 58 which loosely receive the rod 37 to the rear of the mold board as best shown in Fig. 3; and a spring 59 is secured to the upper eye 58 and to the inner lower portion of the plow frame B as is also shown in Fig. 3. The spring 59 pulls downward, and as the plow is lowered in the ditch to further deepen it the wing C and its carrier plate 57 rise correspondingly, placing the spring 59 under tension, so that the spring automatically acts to draw the wing C downward as the plow is raised, and after the wing has passed over an elevation and reaches a depression, while the pivotal connection between the wing and its carrier enables a wing to accommodate itself to any surface over which it is required to pass. As the wing C rises it is enabled to take a more decided rearward inclination, and this is accomplished by securing an arm 60 to an offset from the lower rear portion of the wing, as is shown in Fig. 4, and providing this arm 60 with a recess 61, the recessed portion of the arm being adapted to receive a guide bar 43, which guide bar has an upward and a rearward inclination as is illustrated in Fig. 1. This provision is made for carrying the dirt a greater distance from the ditch when the plow is deep therein than when the plow is first entered.

A boat-shaped guide 61 is provided in connection with the machine, and the said boat-shaped guide is attached to the lower end of an arm 62 in a pivotal manner, but the rocking movement of the boat-guide is limited by stops 63 formed upon its upper edge at its left-hand side, and the arm 62 carrying the boat-guide 61 is carried upward with more or less of a rearward inclination and is held in place on the plow beam 20 by means of a suitable clip 64. When the boat-guide is thus placed in position on the plow beam the said boat-guide will be in direct longitudinal alinement with the point of the plow. The forward end of the boat-shaped guide 61 is more or less pointed, and the under surface of the guide at its forward end is more or less upwardly turned as is shown at 65 in Fig. 1, so that the said guide can move over the bottom of the ditch without interruption. This guide 61 is an effective pilot for the machine at all times; it moves on the surface of the ground when the ditch is commenced and travels on the bottom of the opening during the entire time the ditch is being dug.

In connection with the plow beam I employ two cutters designated respectively as D and D'. These cutters are adapted to cut the sides of the opening to produce the side walls for the ditch. The cutter D' is in alinement with the land side or with the left-hand edge of the plow, and the cutter D is in alinement with the right-hand longitudinal edge of the plow. Each cutter consists of a shank 66 and a blade 67. The shank of the cutter D' is straight but the shank of the cutter D is curved at its upper end, and the upper ends of the shanks of both cutters are adapted to engage with the right-hand side of the plow beam 20, being held in place by means of suitable clips designated respectively as 68 and 69. The clips 68, 69 and 64 are of the same construction, consisting of opposing plates located at opposite sides of the plow beam, and bolts connecting the plates, the bolts extending above and below the beam. The blades 67 are removable from the shanks 66, and the said blades are sharpened at each longitudinal edge, so as to provide two cutting edges designated as $a$ and $a'$, being best shown in Fig. 5; and the forward longitudinal edge of the shank 66 of a cutter is beveled as shown at $a^2$ in Fig. 5, the said beveled portion $a^2$ of a shank being a continuation of the bevel at the cutting edge of the blade attached to the shank, and the said blades have their end portions beveled in opposite directions; and when the blade is in position on a shank the lower forward point is the lowest point. Consequently when one cutting edge of a blade becomes dull the blade can be removed and turned end for end and again secured to the shank, thus bringing a new cutting edge in position for action. The blades are secured to the shanks usually through the medium of screws 70 as shown in Fig. 5.

A horizontal draft bar 71 is secured to the right-hand side of the plow beam 20 at its forward end, and this draft bar is apertured, and a hook 72 connected with the draft device of the harness is made to enter an aperture in the draft bar 71 as may be found most convenient, since the team travels on the surface of the ground at the right-hand side of the ditch.

A curved plate E is pivoted at the rear of the mold-board $B^2$ in order to widen the mold-board when desired at or near the top of the ditch, as, for example, should the ground be very loose at the surface, such widening prevents the earth falling back into the ditch.

Having thus described my invention, I claim as new, and desire to secure by Letters Patent,—

1. In a ditching machine a wheel supported frame, having forwardly and rearwardly extending members, said members being out of alinement, a plow beam, a link connection between the forward and rear ends of the plow beam and the members of the frame, and means connecting the rearwardly extending member of the frame with the rear end of the plow beam whereby the beam may be raised and lowered.

2. In a ditching machine an arched wheel supported frame bar, a forwardly extending frame beam secured at one end to the frame bar, a bar secured to the frame bar between its ends and out of alinement with the frame beam, a plow beam, a link connecting the rear end of the plow beam with the said bar, a link connecting the forward end of the plow beam with the frame beam, and means for raising and lowering the plow beam.

3. In a ditching machine, a plow beam, a plow having its land side pivoted intermediate of its ends to the beam, and means for locking the land side to said beam.

4. In a ditching machine, a plow beam, a plow having its land side pivoted to the beam, a handle secured to the land side of the plow, and a locking device carried by the handle for locking the land side to the beam.

5. In a ditching machine, a wheel supported frame, a frame beam secured to the frame, a plow beam, a link connection between the forward and rear ends of the plow beam and the said frame and frame beam, a rack pivoted at its lower end to the plow beam, a pinion on the frame and meshing with the rack, means for operating the pinion, and means for locking the pinion in position.

6. In a ditching machine, an arched frame bar having spindles at its ends, wheels on the spindles, a longitudinal bar secured to the frame bar, a frame beam secured to the arched bar and to the longitudinal bar, a plow beam having a U-shaped head section at its rear end, a link pivoted to the head section of the plow beam and to the longitudinal bar, a link pivoted to the forward end of the plow beam and to the frame beam, and means for raising and lowering the plow beam and locking it in position.

7. In a ditching machine, a plow beam, a plow having its land side pivoted intermediate of its end to the beam, means for limiting the movement of the plow on the beam, and means for locking the landside to the beam.

8. In a ditching machine, a plow beam, a plow having its land side pivoted to the beam, the rear edge of the land side being recessed, means on the plow beam for engaging the recess of the land side, and means for locking the land side to the beam.

9. In a ditching machine, a plow beam having an apertured bracket at its rear end, a plow having its land side apertured and pivoted to the beam, means for limiting the swinging movement of the plow, and a pin for engaging the apertures of the bracket and land side.

10. In a ditching machine, a plow beam, an apertured bracket projecting upwardly from the rear end of the plow beam, a plow having its land side pivoted to the plow beam, said land side being provided with an aperture at its rear upper portion, an operating lever carried by the plow, and a spring actuated locking pin carried by the operating lever and adapted to engage an aperture in the bracket of the beam and the aperture of the land side.

11. In a ditching machine, a plow beam having an upwardly projecting and apertured bracket, the lower end of the bracket having a lateral flange, a plow having its land side pivoted to the beam, the rear portion of the land side being notched and provided with an aperture, an operating lever carried by the plow, a locking pin adapted to engage an aperture of the bracket of the beam and the aperture of the land side, and means for operating the pin.

12. In a ditching machine, an arched body bar, axles secured to the ends of the body bar, wheels mounted on said axle, a beam also secured to said body bar, a ditching apparatus located beneath the beam, pivoted hangers connecting the beam with the ditching apparatus, and means for raising and lowering the ditching apparatus.

13. In a ditching machine, a wheel supported frame, a plow beam adjustably suspended from the frame, a plow having its landside pivoted to the beam, and means for locking the landside to the beam.

14. In a ditching machine, a plow, a shank therefor, a guide adjustably attached to the beam in front of the plow, the said boat-shaped guide being in longitudinal alinement with the plow point, cutters adjustably secured to the said beam between the guide and the plow point, one cutter extending from the beam substantially flush with the left-hand side of the plow and the other cutter extending from the said beam flush with the right-hand side of the plow.

In testimony whereof I have signed my name to this specification in the presence of two subscribing witnesses:

WALTER UMSTEAD.

Witnesses:
    GEORGE D. VOGNETZ,
    WILLIAM SPRINGER.